(12) United States Patent
Carlson et al.

(10) Patent No.: US 6,757,604 B2
(45) Date of Patent: Jun. 29, 2004

(54) METHOD AND APPARATUS FOR DETERMINING TORQUE AT DESIRED LOCATIONS ON A MACHINE

(75) Inventors: Douglas A. Carlson, Morton, IL (US);
Todd D. Creger, Geneva, IL (US);
Wayne M. Ferrell, Peoria, IL (US);
Javad Hosseini, Edelstein, IL (US);
Kenneth P. Liesener, Peoria, IL (US);
Sri K. Rangarajan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/037,601

(22) Filed: Nov. 9, 2001

(65) Prior Publication Data

US 2003/0093205 A1 May 15, 2003

(51) Int. Cl.⁷ .............................................. G06F 17/00
(52) U.S. Cl. .......................... 701/53; 701/51; 477/185; 477/113
(58) Field of Search .............................. 701/53, 51, 59, 701/57; 477/185, 113, 110

(56) References Cited

U.S. PATENT DOCUMENTS

| | | | |
|---|---|---|---|
| 4,680,959 A | | 7/1987 | Henry et al. ................ 73/113.3 |
| 5,406,486 A | | 4/1995 | Kamio et al. ................. 701/74 |
| 5,452,207 A | | 9/1995 | Hrovat et al. .................. 701/1 |
| 5,484,351 A | * | 1/1996 | Zhang et al. ............... 477/113 |
| 5,910,176 A | | 6/1999 | Creger ........................ 701/59 |
| 6,125,314 A | * | 9/2000 | Graf et al. .................... 701/53 |
| 6,269,702 B1 | * | 8/2001 | Lambson ............... 73/862.045 |
| 6,275,761 B1 | * | 8/2001 | Ting ........................... 701/59 |
| 6,416,441 B1 | * | 7/2002 | Eckert et al. ............... 477/185 |

OTHER PUBLICATIONS

SAE Tech Paper Series 980516, Feb. 23–26, 1998: Virtual Sensing: A Neural Network–based Intelligent Performance and Emissi.

Technical Paper 111: Neural Network Modelling of the Emissions and Performance of a Heavy–duty Diesel Engine.

* cited by examiner

Primary Examiner—William A. Cuchlinski, Jr.
Assistant Examiner—Olga Hernandez
(74) Attorney, Agent, or Firm—Steve D. Lundquist

(57) ABSTRACT

A method and apparatus for determining a value of torque at a desired location on a machine. The method and apparatus includes choosing the desired location, determining an operating condition relevant to the desired location, determining a plurality of parameters of the machine, and determining a value of torque at the desired location as a function of the operating condition and the plurality of parameters.

7 Claims, 14 Drawing Sheets

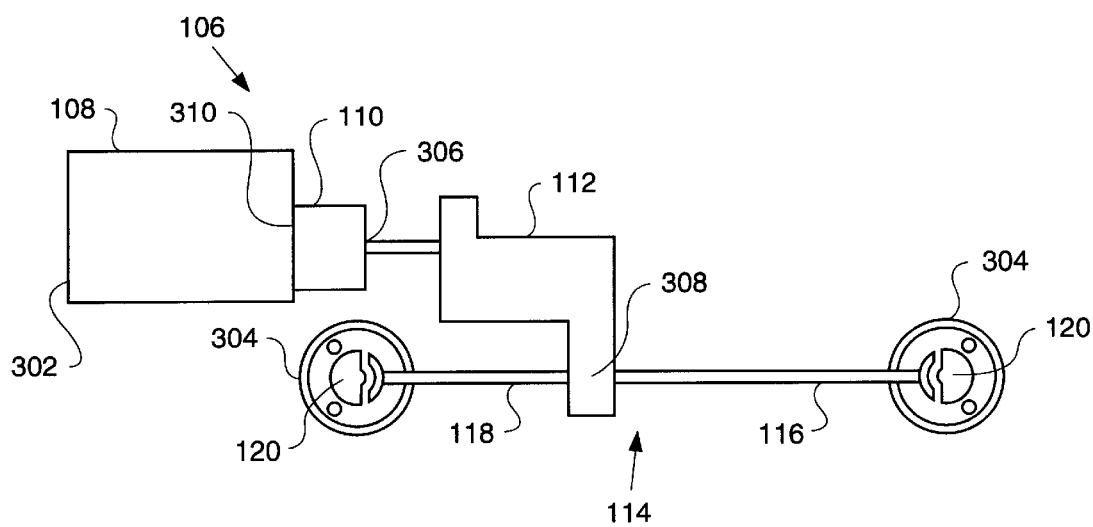
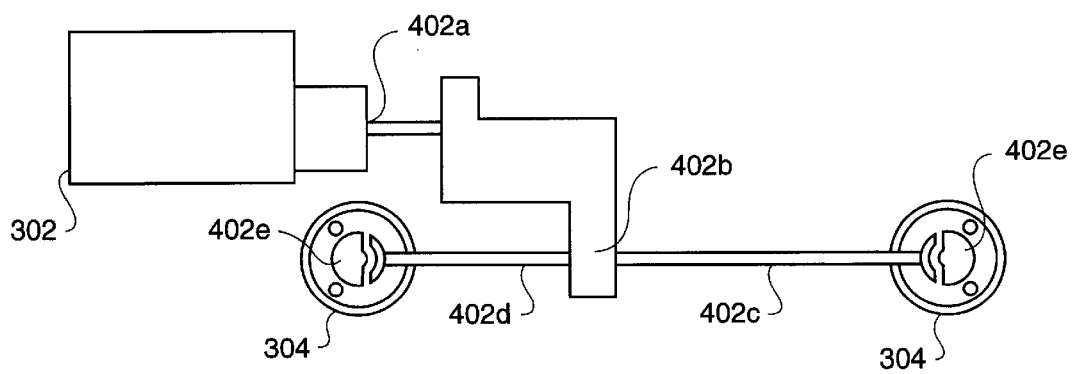
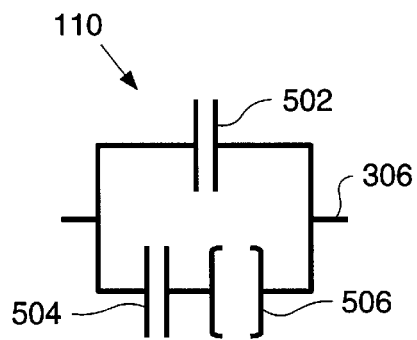

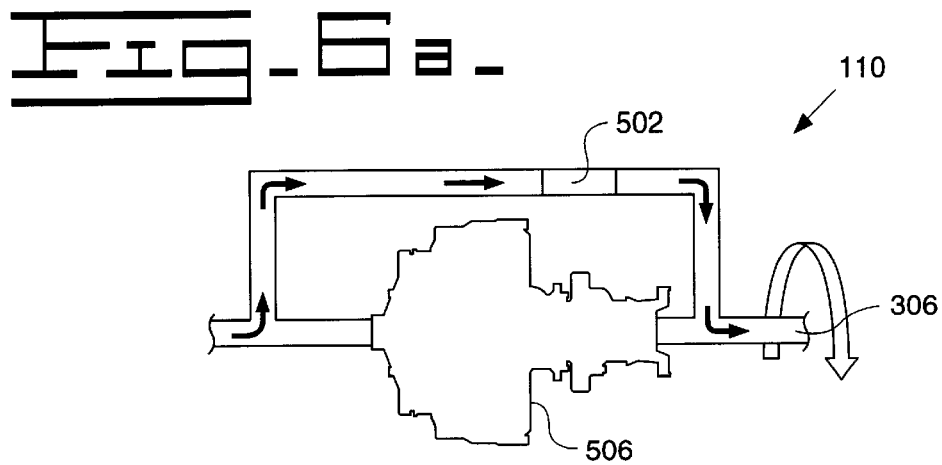
Fig_6a_
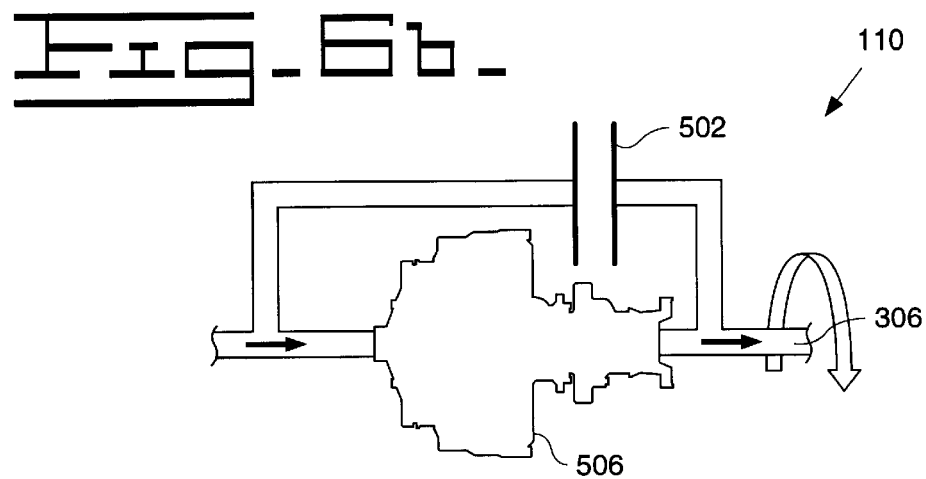
Fig_6b_
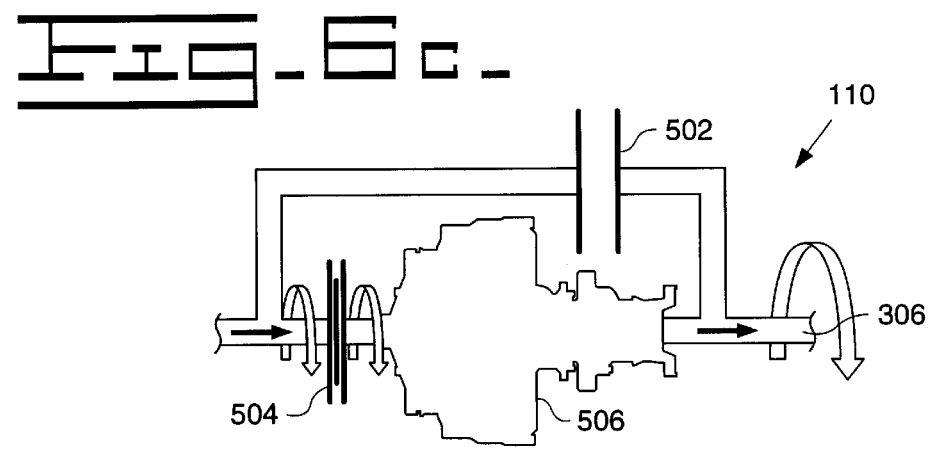
Fig_6c_

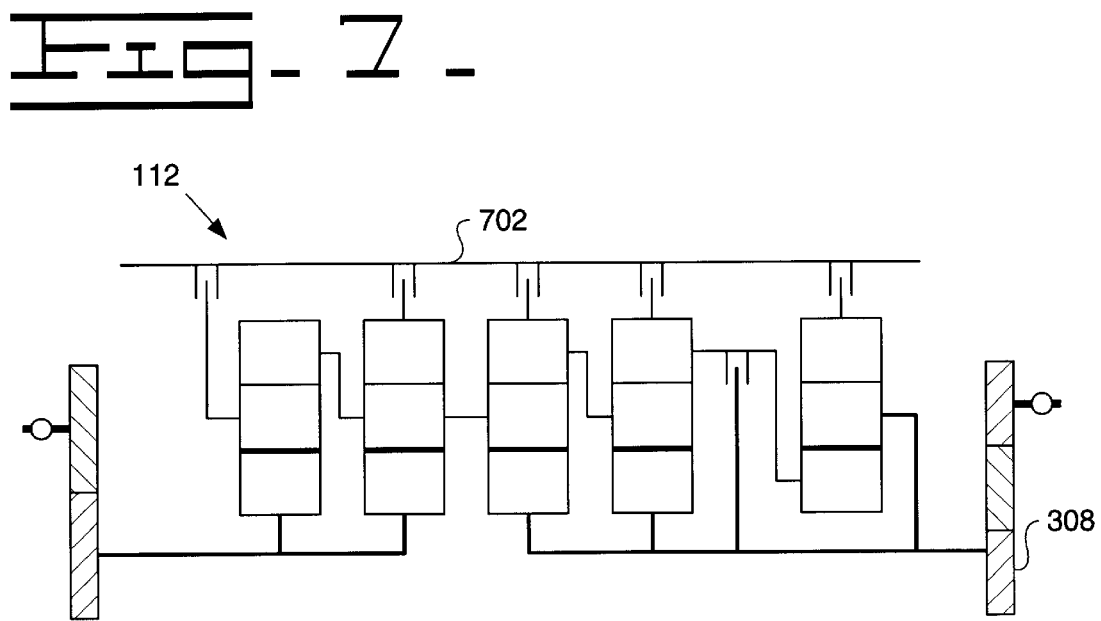
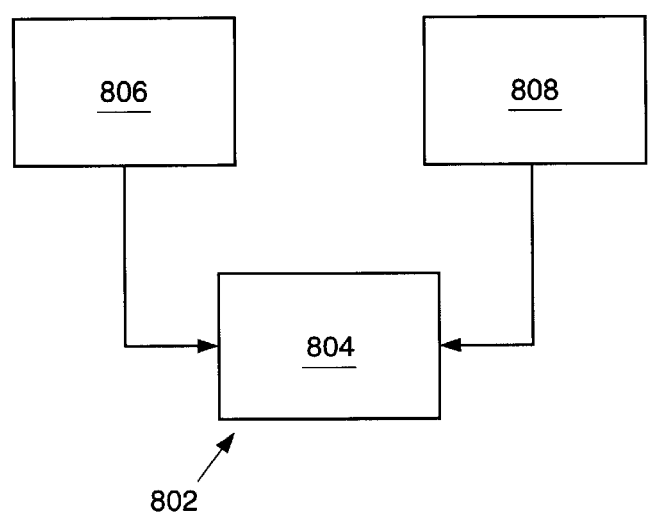

Fig-11-

Fig_15.

DESIRED LOCATION: TRANSMISSION OUTPUT
CONDITION: CLUTCHES LOCKED

TORQUE IN
EFFICIENCY
INERTIA
ACCELERATION
GEAR RATIO

EQ – 2

ESTIMATED TORQUE

802

804

$$Torque_{out} = [(Torque_{in} * eff) - (I * Accel)] * GEAR\ RATIO$$

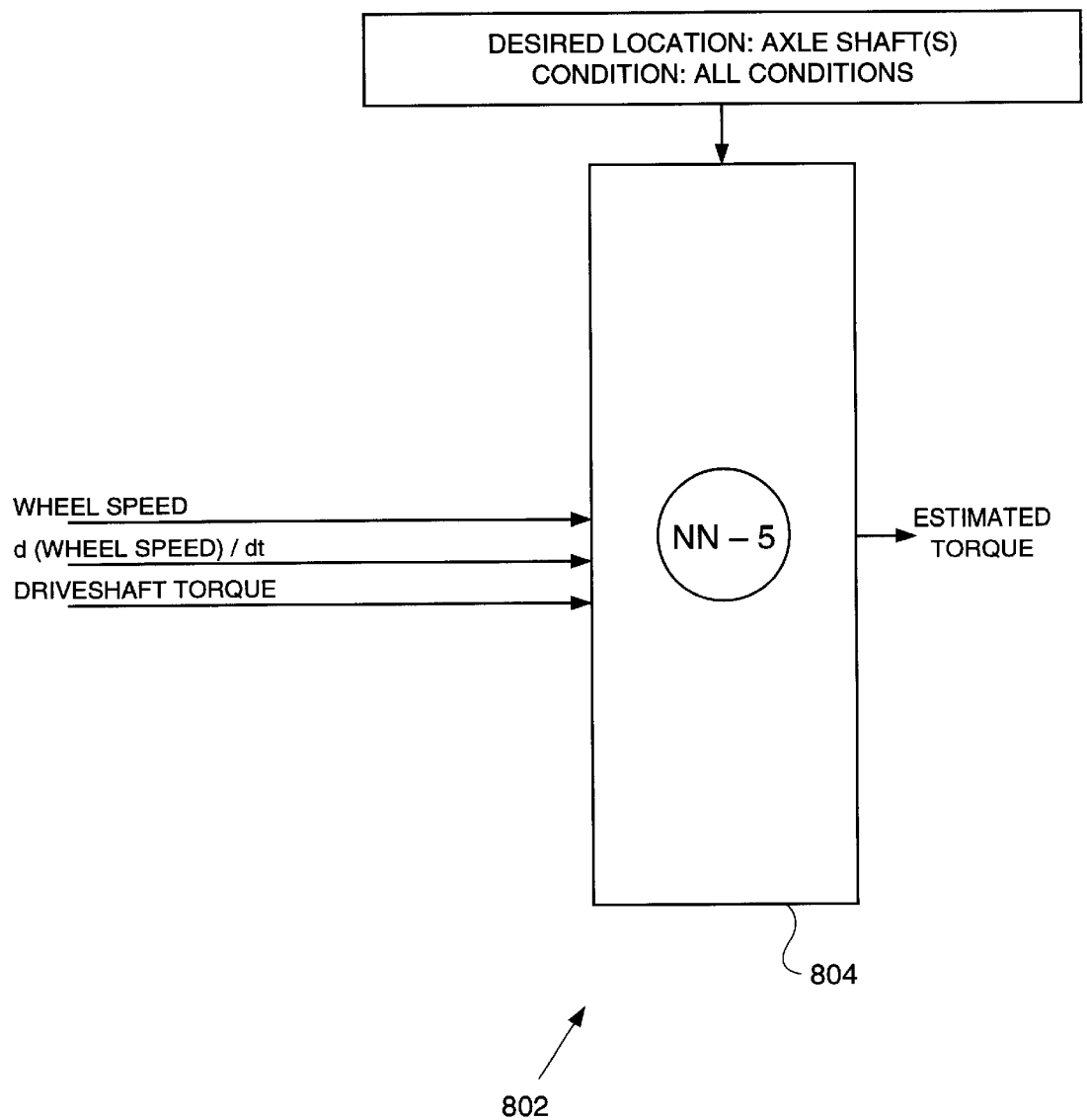

METHOD AND APPARATUS FOR DETERMINING TORQUE AT DESIRED LOCATIONS ON A MACHINE

TECHNICAL FIELD

This invention relates generally to a method and apparatus for determining a value of torque at a desired location on a machine and, more particularly, to a method and apparatus for determining a value of torque as a function of the desired location and an operating condition relevant to the desired location.

BACKGROUND

It is often desired to know, during operation of a machine, how much torque is being applied to one or more locations on the machine. For example, a mobile machine having a drivetrain, e.g., an engine, torque converter, transmission, driveshaft, and axle shafts, generates torque all along the drivetrain during operation. The torque at these locations provides the power to perform the specific work functions demanded, but also create stresses on the components, thereby impacting the life of the various portions of the drivetrain.

It is therefore desired to have the ability to know how much torque is being applied throughout the operating life of the machine. Attempts have been made to use torque sensors, such as strain gauges and the like. However, the stress caused by the applied torque also causes stress-related problems with the sensors themselves, resulting in frequent inaccuracies and failure of the sensors. Furthermore, the required locations for the sensors often are in harsh environments. For example, a mobile machine such as an earthworking machine, e.g., wheel loader, truck, track-type tractor, agricultural machine, and the like, usually operates in harsh environments. Thus, the drivetrain of one of these machine, i.e., the location of any torque sensors used, is usually exposed to harsh operating conditions. The sensors, as a result, usually do not last very long.

Since the sensors themselves can be quite costly, the frequent loss of these sensors can be economically prohibitive.

Attempts have been made, with limited success, to determine the torque at a location based on data received from various parameters on the machine. For example, in U.S. Pat. No. 5,910,176, Creger discloses an apparatus and method for using a plurality of parameters associated with operation of an engine to determine a model of the torque being generated by the engine. However, a drivetrain has torque applied at many locations, and several of the locations would require a different approach for determining torque dependent upon an operating condition associated with that location. Since it is usually desired to know the value of torque being applied at many locations along a drivetrain, the operating condition must be known, and different sets of operating parameters must be chosen for each desired location.

Furthermore, since a drivetrain has a start location, e.g., an engine, and an end location, e.g., a set of axle shafts, it may be required to determine torque at each location from start to the desired location, since torque at the desired location is typically a function of torque at a preceding location. For example, to determine torque at the output of a transmission, it may be necessary to first determine torque at the output of a torque converter. Thus, an operating condition and a set of parameters may be needed to determine specifically the torque at the output of the torque converter, and another operating condition and another set of parameters may be needed to determine the torque at the output of the transmission.

The present invention is directed to overcoming one or more of the problems as set forth above.

SUMMARY OF THE INVENTION

In one aspect of the present invention a method for determining a value of torque at a desired location on a machine is disclosed. The method includes the steps of choosing the desired location, determining an operating condition relevant to the desired location, determining a plurality of parameters of the machine, and determining a value of torque at the desired location as a function of the operating condition and the plurality of parameters.

In another aspect of the present invention a method for determining a value of torque at a desired location on a mobile machine is disclosed. The mobile machine has a drivetrain, the drivetrain including an engine, a torque converter, a transmission, at least one driveshaft, and at least one axle shaft. The method includes the steps of choosing a desired location on the drivetrain, determining an operating condition relevant to the desired location, determining a plurality of parameters of the mobile machine, and determining a value of torque at the desired location as a function of the operating condition and the plurality of parameters.

In another aspect of the present invention an apparatus for determining a value of torque at a desired location on a machine is disclosed. The apparatus includes a plurality of locations on the machine, means for determining an operating condition relevant to the desired location, means for determining a plurality of parameters of the machine, and processing means for determining the desired location, receiving information relevant to the operating condition at the desired location and the plurality of parameters, and determining a value of torque at the desired location using one of a neural network and an equation.

In another aspect of the present invention a method for estimating a value of torque at a desired location on a machine is disclosed. The method includes the steps of choosing the desired location, determining an operating condition relevant to the desired location, determining a plurality of parameters of the machine, and estimating a value of torque at the desired location as a function of the operating condition and the plurality of parameters, wherein the value of torque is estimated by one of an equation and a neural network chosen as a function of the desired location and the operating condition.

In another aspect of the present invention a method for determining a value of torque at a desired location on a machine is disclosed. The method includes the steps of choosing the desired location, determining a location preceding the desired location, determining a first operating condition relevant to the location preceding the desired location, determining a second operating condition relevant to the desired location, choosing a first plurality of parameters of the machine in response to the location preceding the desired location and the first operating condition, choosing a second plurality of parameters of the machine in response to the desired location and the second operating condition, determining a value of torque at the location preceding the desired location as a function of the first operating condition and the first plurality of parameters, and determining a value of torque at the desired location as a function of the determined value of torque at the location preceding the desired location, the second operating condition, and the second plurality of parameters.

BRIEF DESCRIPTION OF THE DRAWINGS

FIG. 3 is a diagrammatic illustration of a drivetrain for a machine;

FIG. 4 is a further embodiment of the drivetrain of FIG. 3;

FIG. 5 is a diagrammatic illustration of a torque converter;

FIGS. 6a–6c are diagrammatic illustrations of various operating conditions of a torque converter;

FIG. 7 is a diagrammatic illustration of a set of clutches for a transmission;

FIG. 8 is a block diagram illustrating a preferred embodiment of the present invention;

FIG. 18 is a diagrammatic illustration of an eighth aspect of the present invention.

DETAILED DESCRIPTION

Figure 1:
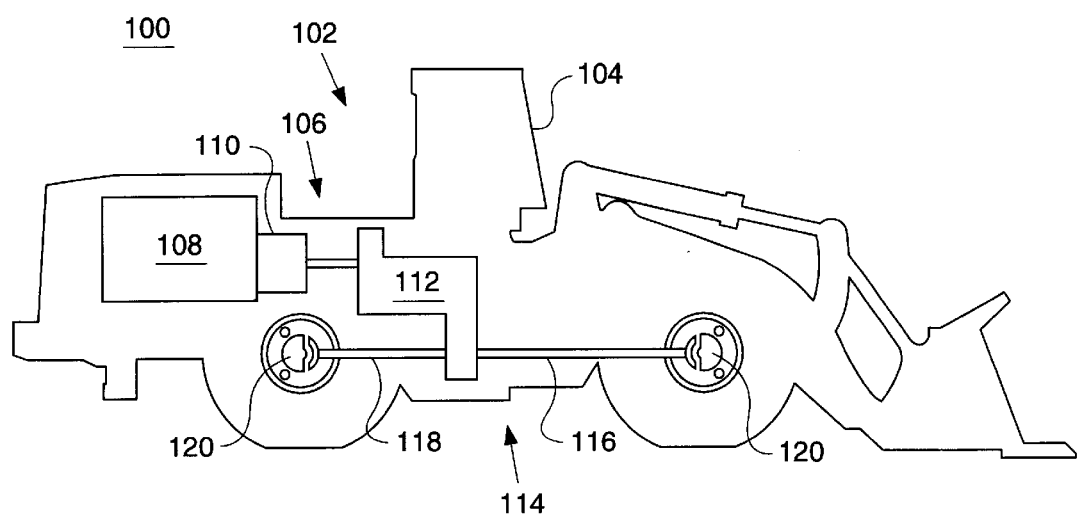
FIG. 1 is a diagrammatic illustration of a machine suitable for use with the present invention.

Referring to the drawings and the appended claims, a method and apparatus 100 for determining a value of torque at a desired location on a machine 102 is disclosed.

Referring to FIG. 1, a diagrammatic illustration of a machine 102 is shown. In particular, the machine 102 is depicted as a mobile machine 104, such as a wheel loader. However, other types of machines, mobile or fixed, may be used with the present invention. For example, other types of mobile machines, such as trucks, bulldozers, tractors, compactors, and the like, may be used. In addition, fixed, i.e., non-mobile machines, such as generators, manufacturing machines, and the like, may also be used. All of the above mentioned exemplary machines are designed to produce and transmit torque to perform desired work functions. As such, the machines listed above are examples of machines in which it is desired to be able to determine the value of torque at various locations on the machines.

The machine of FIG. 1 includes a drivetrain 106 to deliver torque for the required work purpose. In the preferred embodiment, the drivetrain 106 includes an engine 108, such as an internal combustion engine. The engine 108 is the preferred means for generating power to produce torque. The drivetrain 106 also preferably includes a torque converter 110, a transmission 112, at least one driveshaft 114, and at least one axle shaft 120.

Figure 2:
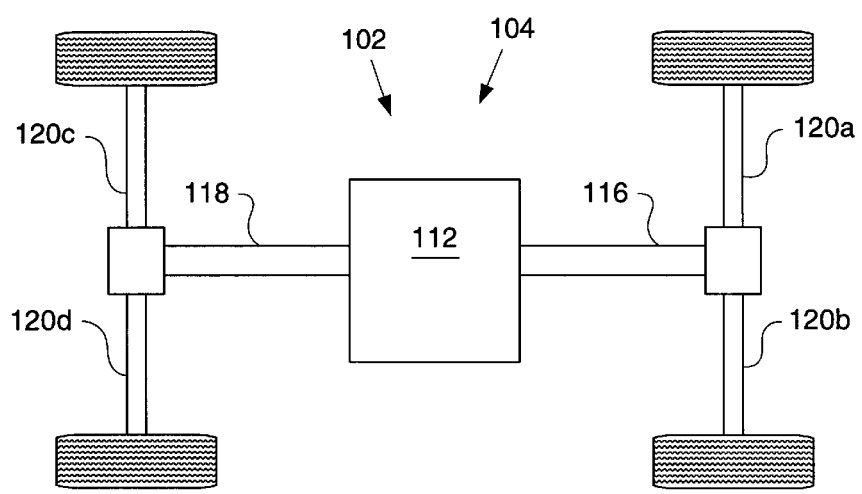
FIG. 2 is an alternate view of a portion of the machine of FIG. 1.

FIG. 2 illustrates an alternate view of a portion of the machine 102 of FIG. 1. More particularly, FIG. 2 depicts a top view of a portion of the drivetrain 106. The driveshaft 114 of FIG. 1 is shown in FIG. 2 as a first driveshaft 116 and a second driveshaft 118. In this embodiment, the first driveshaft 116 delivers torque to first and second axle shafts 120a,b. In like manner, the second driveshaft 118 delivers torque to third and fourth axle shafts 120c,d. It is noted that a machine 102 may have only one driveshaft 114, designed to deliver torque to two axle shafts 120, such as first and second axle shafts 120a,b. It is also noted that a drivetrain 106 may include other configurations and numbers of driveshafts 114 and axle shafts 120 without deviating from the spirit and scope of the present invention.

The mobile machine 104 of FIGS. 1 and 2, depicted as a wheel loader, uses the drivetrain 106 to deliver power in the form of torque to ground engaging members, such as wheels (not labeled in the drawings), to provide mobility for the machine 102. Alternatively, the drivetrain 106 may deliver torque to a set of tracks (not shown) for mobility, may deliver torque to an electric power generator, or may deliver torque for any of a number of other work functions. For purposes of ease of explanation, the specification will hereinafter describe the present invention with reference to the machine 102 depicted in FIGS. 1 and 2, i.e., a mobile machine 104.

Referring to FIGS. 3 and 4, the drivetrain 106 is shown to illustrate additional features. In FIG. 3, the drivetrain 106 includes a start location 302, in which the torque is generated, preferably the engine 108. An end location 304 is the final delivery location of the torque, in this case the axle shafts 120 and wheels. The torque converter 110 includes a torque converter output 306, and the transmission 112 includes a transmission output 308. Preferably, the torque converter output 306 delivers torque to the transmission 112, and the transmission output 308 delivers torque to the driveshaft 114, e.g., the first driveshaft 116 and the second driveshaft 118.

FIG. 4 shows a series of desired locations 402 for determining torque under various operating conditions. For example, a first desired location 402a is at the torque converter output 306, a second desired location 402b is at the transmission output 308, a third desired location 402c is at the first driveshaft 116, a fourth desired location 402d is at the second driveshaft 118, and a fifth desired location 402e is at one or more axle shafts 120. It is noted that other desired locations 402 may exist along the drivetrain 106, and that the desired locations 402a–e are shown for purposes of illustration.

Referring to FIG. 5, a diagrammatic illustration of a typical torque converter 110 is shown. The torque converter 110 depicted in FIG. 5 is commonly found in large construction machines, such as wheel loaders. Variations of this embodiment of a torque converter are found in other machines. However, the various embodiments of torque converters are still readily applicable to the present invention.

A lock-up clutch 502, provides an alternate path which bypasses the torque converter 110 itself. Thus, with the lock-up clutch 502 engaged, the torque delivered by the engine 108 is routed around a torque converter unit 506, and is applied directly to the torque converter output 306. The torque converter unit 506 represents the main working portion of the torque converter 110. When the lock-up clutch 502 is disengaged, the torque from the engine 108 routes directly through the torque converter unit 506, and is thus controlled by the torque converter 110 by means well known in the art.

An impeller clutch 504 located at the input of the torque converter unit 506 is controllably used to modulate the torque delivered from the engine 108 to the torque converter 110. More specifically, when the impeller clutch 504 is locked, the torque from the engine 108 is delivered directly to the torque converter unit 506, assuming the lock-up clutch 502 is disengaged. When the impeller clutch 504 is in a slipping state, the torque from the engine 108 is modulated in a controlled manner and delivered in the modulated condition to the torque converter unit 506. Once again, the lock-up clutch 502 is assumed to be disengaged.

Referring to FIGS. 6a–6c, the various operating conditions of the torque converter 110 are illustrated. In FIG. 6a, the lock-up clutch 502 is engaged and the torque is routed around the torque converter unit 506. In FIG. 6b, the lock-up clutch 502 is disengaged and the torque is routed through the torque converter unit 506. In FIG. 6c, the lock-up clutch 502 is disengaged and the impeller clutch 504 is in a slipping state. Thus, the torque is modulated and routed through the torque converter unit 506.

FIG. 7 illustrates a set of transmission clutches 702 located in a transmission 112. Typically, the transmission 112 is in one of two operating conditions. Either the set of transmission clutches 702 are in a locked state or the set of transmission clutches 702 are in a slipping state, i.e., the transmission 112 is in the process of shifting gears (not shown).

Referring to FIG. 8, a block diagram illustrating a preferred embodiment of the present invention is shown. Processing means 802 are used for determining a value of torque at one or more desired locations 402, as is described in more detail below. In the preferred embodiment, the processing means 802 includes a processor 804 located on the machine 102. The processor 804 is preferably of a type well known in the art, such as a microprocessor.

Means 806 for determining an operating condition are used to determine an operating condition relevant to the desired location 402. For example, if the desired location 402 is at the torque converter output 306, the operating condition is preferably a function of the operating state of the lock-up clutch 502, i.e., either engaged or disengaged, and of the impeller clutch 504, i.e., either locked or slipping. The means 806 for determining an operating condition may employ sensors (not shown) or any other methods known in the art.

Means 808 for determining a plurality of parameters are used to determine various parameters of the machine 102, such as various speeds, pressures, temperatures, displacements, and the like. The means 808 for determining a plurality of parameters may utilize sensors (not shown), may calculate values from other sensed values (such as derivatives of sensed values), or may use any other methods known in the art. The plurality of parameters will vary as a function of the desired location 402 and the operating condition relevant to the desired location 402, and is described in more detail below.

The processing means 802 is adapted for determining the desired location 402, receiving information relevant to the operating condition at the desired location 402 from the means 806 for determining an operating condition, receiving information relevant to the plurality of parameters from the means 808 for determining a plurality of parameters, and responsively determining a value of torque at the desired location 402 using one of a variety of neural networks and equations, as is described in more detail below.

Figure 9:
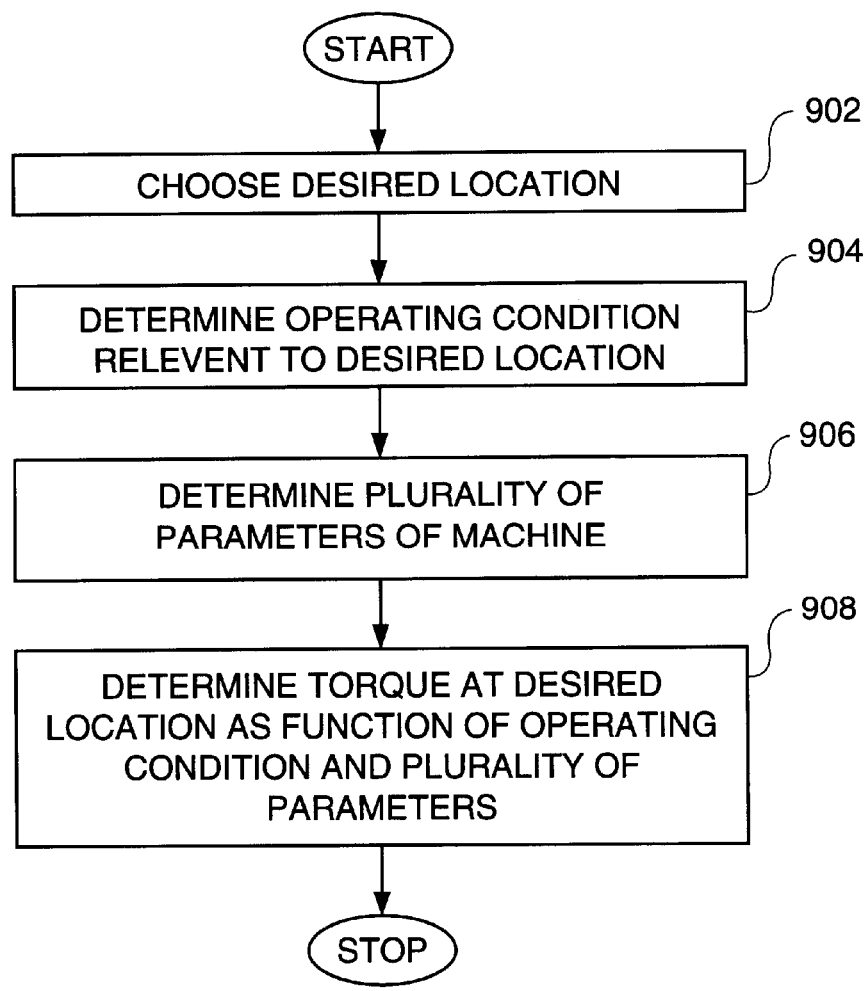
FIG. 9 is a flow diagram illustrating a preferred method of the present invention.

Referring to FIG. 9, a flow diagram illustrating a preferred method of the present invention is shown.

In a first control block 902, a desired location on the drivetrain 106 for determining torque is chosen. Examples of desired locations, as shown in FIG. 4, include, but are not limited to, a first desired location 402a at the torque converter output 306, a second desired location 402b at the transmission output 308, a third desired location 402c at the first driveshaft 116, a fourth desired location 402d at the second driveshaft 118, and a fifth desired location 402e at one or more of the axle shafts 120.

In a second control block 904, an operating condition relevant to the desired location is determined. For example, if the desired location is at the torque converter output 306, an operating condition may be determined as being one of direct drive, i.e., lock-up clutch 502 engaged, converter drive, i.e., lock-up clutch 502 disengaged, and modulated impeller, i.e., lock-up clutch disengaged and impeller clutch 504 slipping. As another example, if the desired location is at the transmission output 308, an operating condition may be determined as the set of transmission clutches 702 being in one of a locked and a slipping state.

In a third control block 906, a plurality of parameters of the machine 102 is determined. Preferably, the plurality of parameters is chosen in response to the desired location and the operating condition. Examples of parameters chosen and determined are described in detail below.

In a fourth control block 908, a value of torque is determined at the desired location as a function of the operating condition and the plurality of parameters. In the preferred embodiment, the torque is determined by estimating a value of torque using one of an equation and a neural network as a function of the desired location and the operating condition.

FIGS. 11–18 illustrate in detail examples of the various neural networks and equations that may be used to determine torque at various locations on the drivetrain 106 of a machine 102. It is noted that the neural networks and equations, including the inputs shown, are for illustrative purposes only and may be deviated from without altering the scope and spirit of the present invention. In the preferred embodiment, the neural networks and equations are processed by the processing means 802, preferably a processor 804 located on the machine 102.

Figure 11:
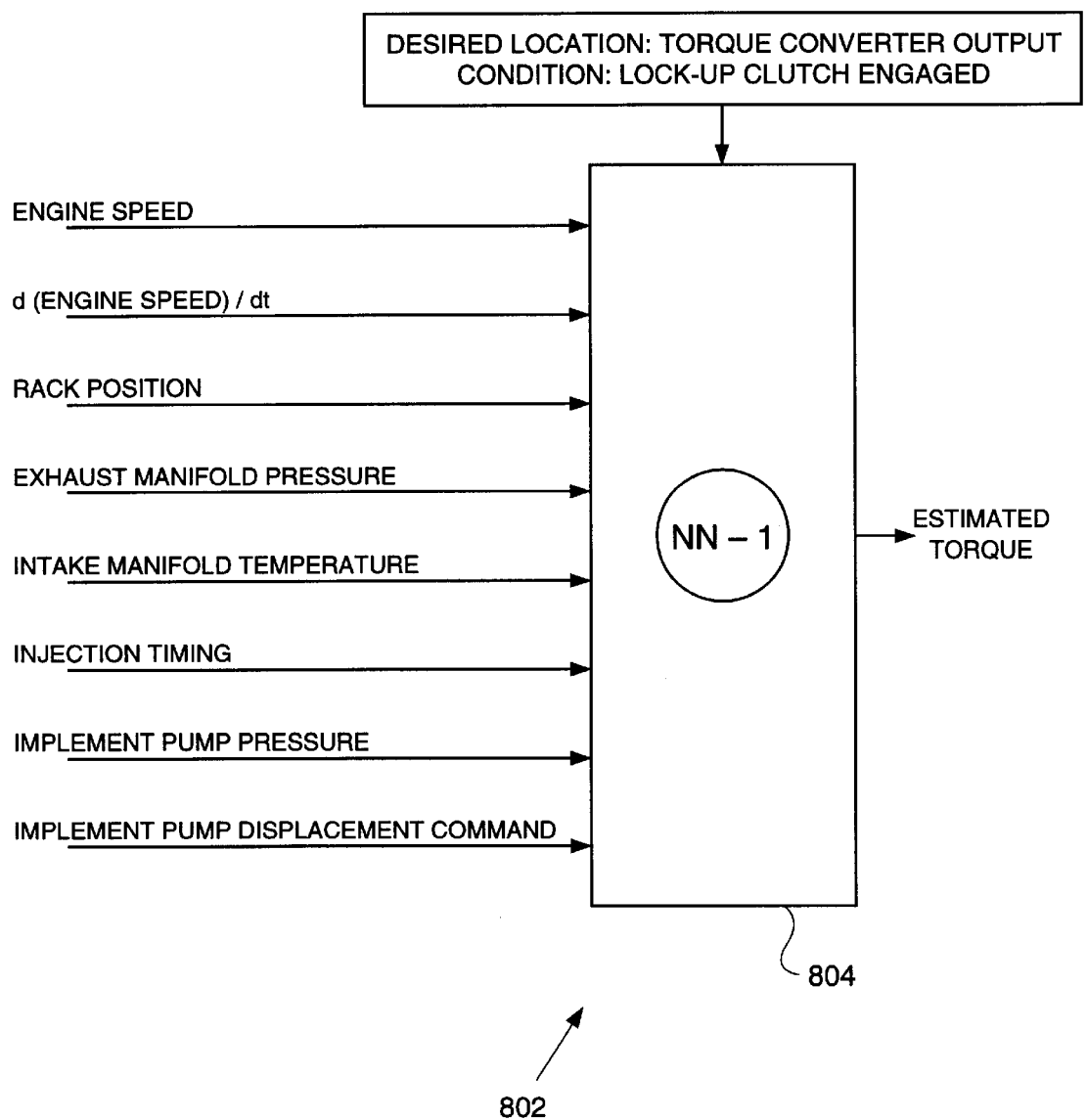
FIG. 11 is a diagrammatic illustration of a first aspect of the present invention.

In FIG. 11, a first neural network, NN-1, is used to estimate the torque at the torque converter output 306 when the operating condition is lock-up clutch 502 engaged. The parameters which are input to the neural network, as shown in FIG. 11, may be sensed directly, or may be derived from other parameters. The parameters shown in FIG. 11 are indicative of those which exist in a hydraulically-controlled work machine, such as a wheel loader. For example, the parameters "implement pump pressure" and "implement pump displacement command" apply to a hydraulic work implement on such a machine. A different type of machine 102 would result in a different set of parameters being used.

Figure 12:
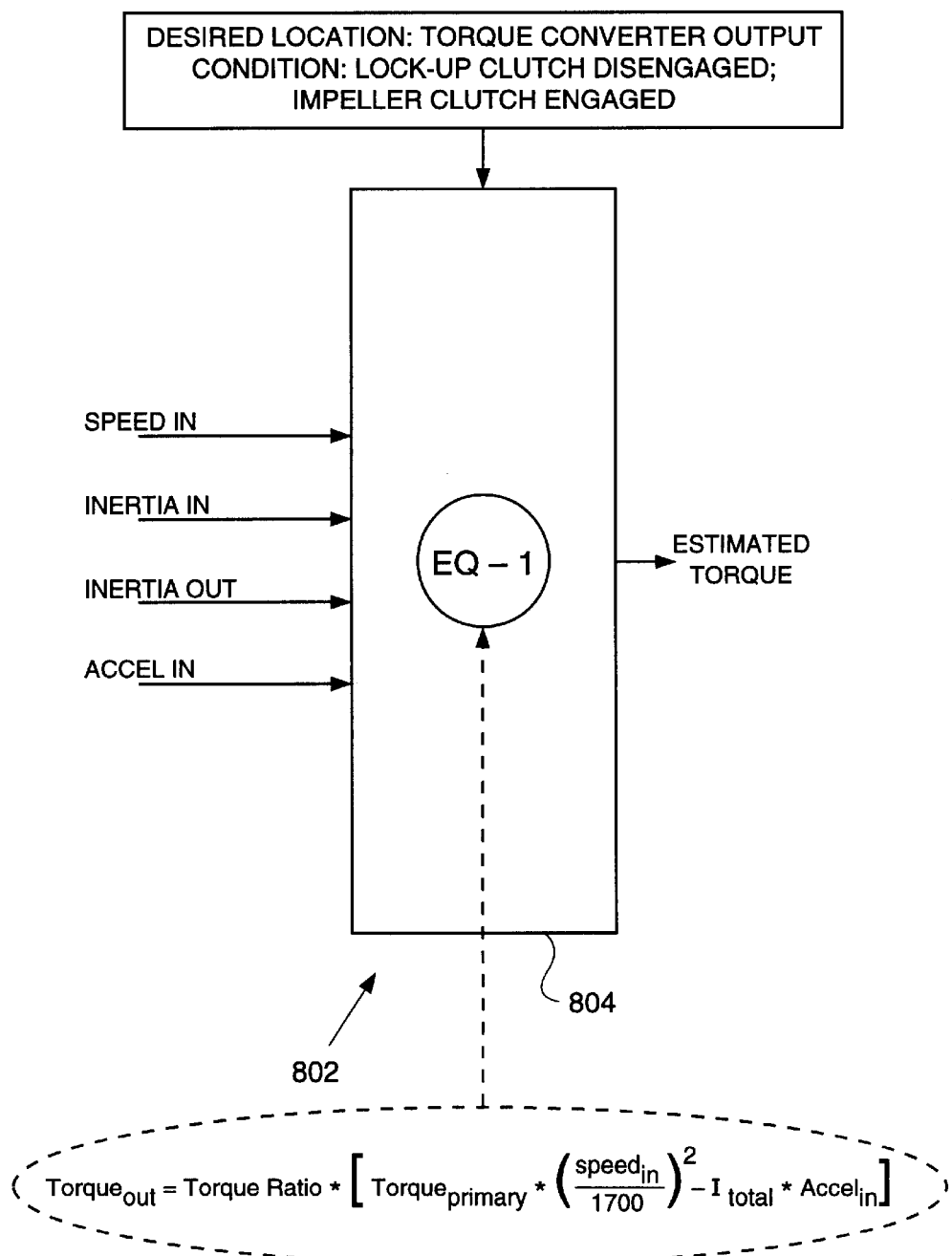
FIG. 12 is a diagrammatic illustration of a second aspect of the present invention.

In FIG. 12, a first equation, EQ-1, is used to estimate the torque at the torque converter output 306 when the operating condition is lock-up clutch 502 disengaged. The parameters which are input to the processing means 802 are either sensed or derived from the input and output of the torque converter 110.

The term in the equation, Torque$_{primary}$, refers to the torque at the input of the torque converter 110, when referenced to a 1700 rpm convention-based reference speed. Preferably, Torque$_{primary}$ is derived from another neural network or equation prior to the present derivation.

Figure 13:
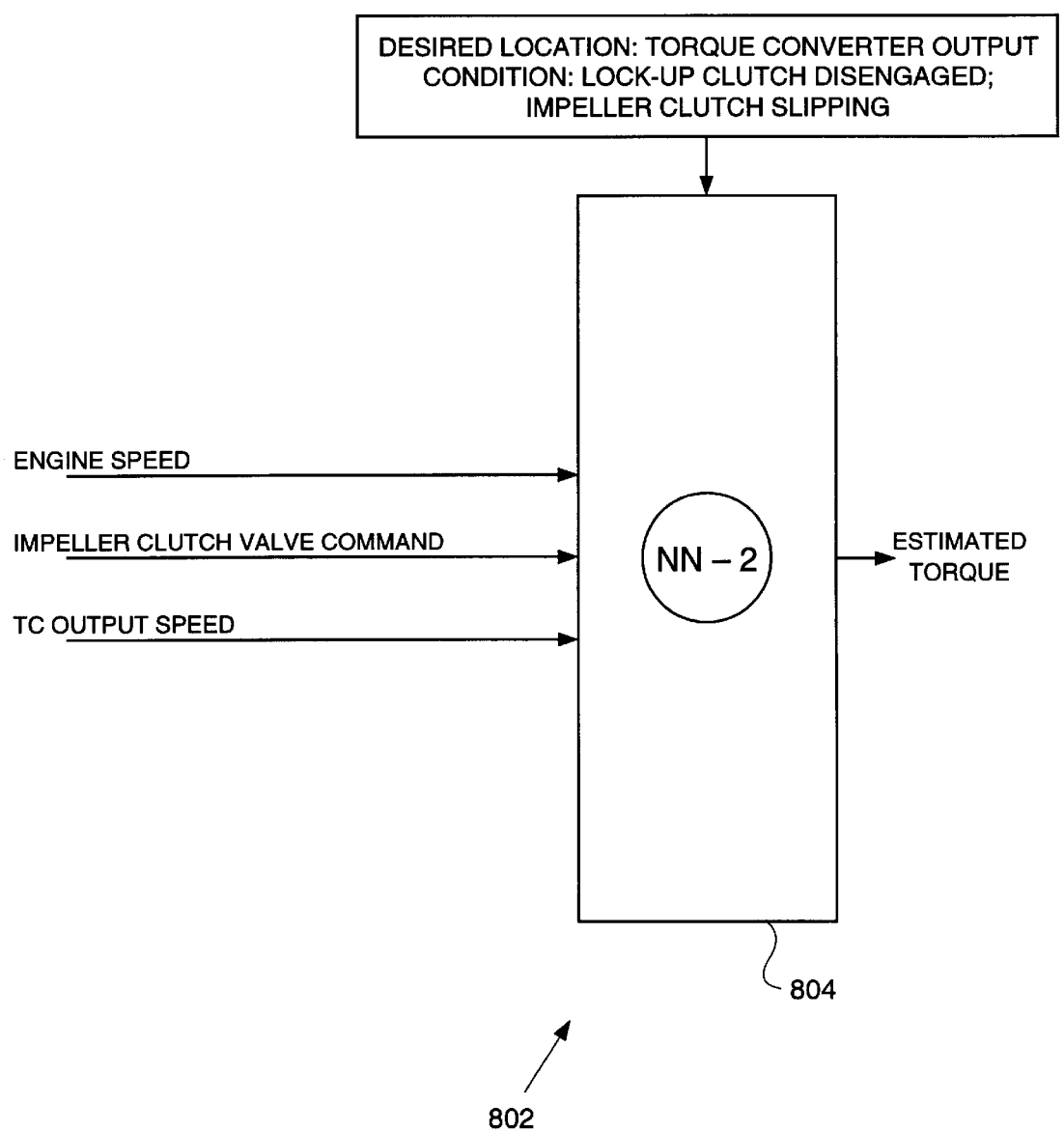
FIG. 13 is a diagrammatic illustration of a third aspect of the present invention.

In FIG. 13, a second neural network, NN-2, is used to estimate the torque at the torque converter output 306 when the operating condition is lock-up clutch 502 disengaged and impeller clutch 504 slipping.

Figure 14:
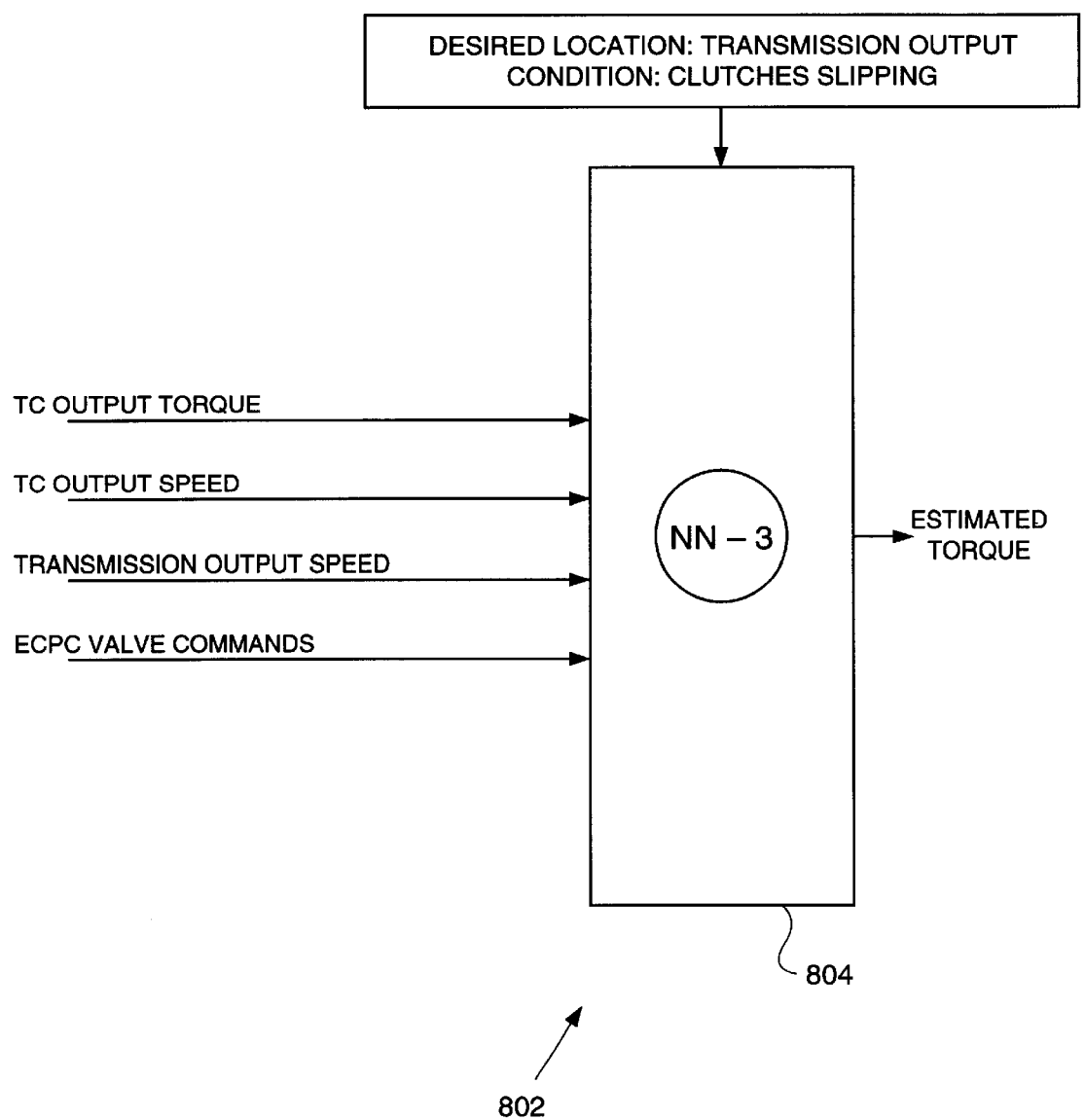
FIG. 14 is a diagrammatic illustration of a fourth aspect of the present invention.

In FIG. 14, a third neural network, NN-3, is used to estimate the torque at the transmission output 308 when the operating condition is set of transmission clutches 702 slipping, i.e., the transmission 112 is shifting. The parameter "ECPC valve commands" refers to commands being delivered to a proportional valve; more specifically, an Electronic Clutch Pressure Control valve. The parameter "tc out torque" is the torque at the torque converter output 306, and is preferably determined by the method described above with respect to one of Figs. 11–13.

Figure 15:
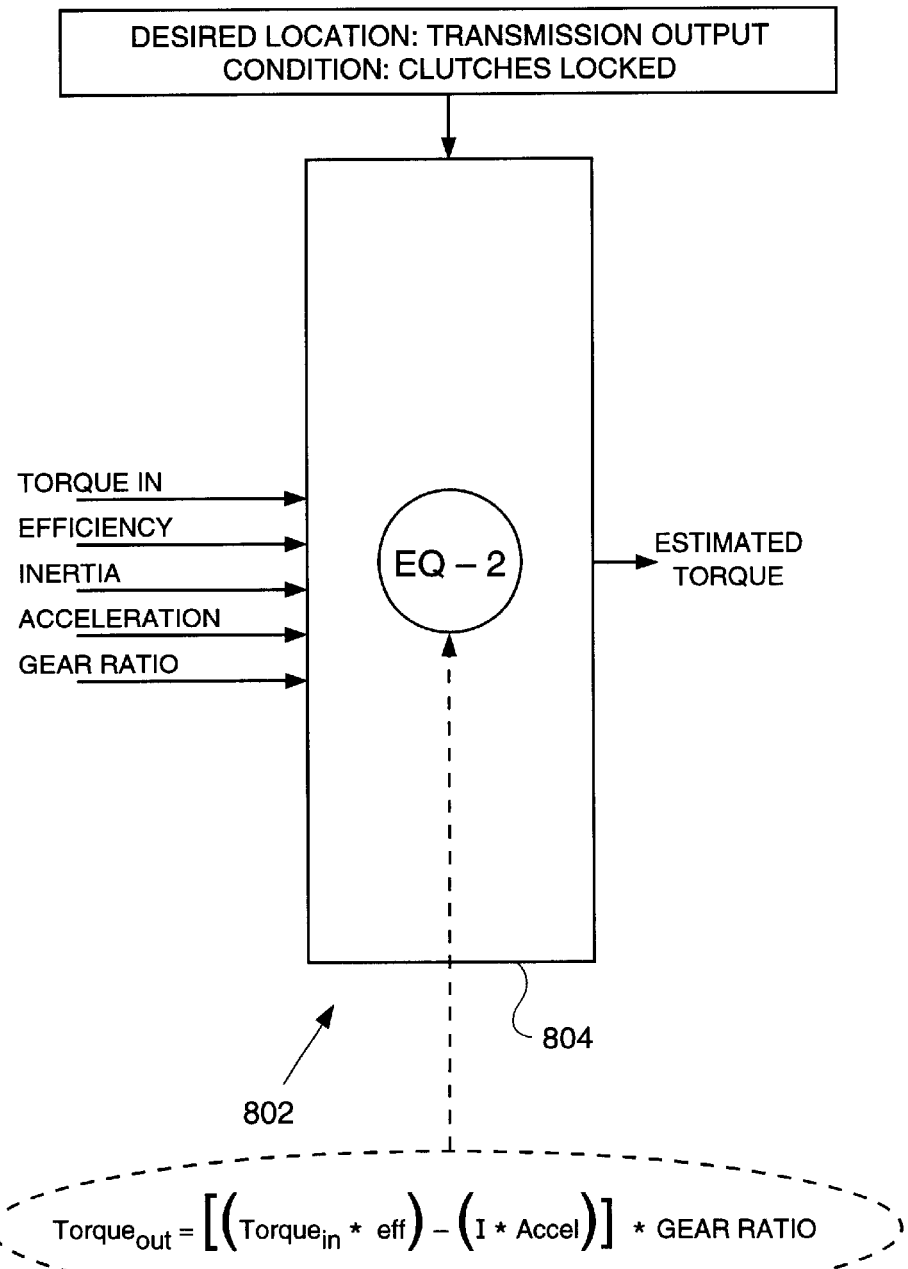
FIG. 15 is a diagrammatic illustration of a fifth aspect of the present invention.

In FIG. 15, a second equation, EQ-2, is used to estimate the torque at the transmission output 308 when the condition is set of transmission clutches 702 locked. Once again, the parameter "torque in" refers to the torque at the torque converter output 306, which is derived as described above.

Figure 16:
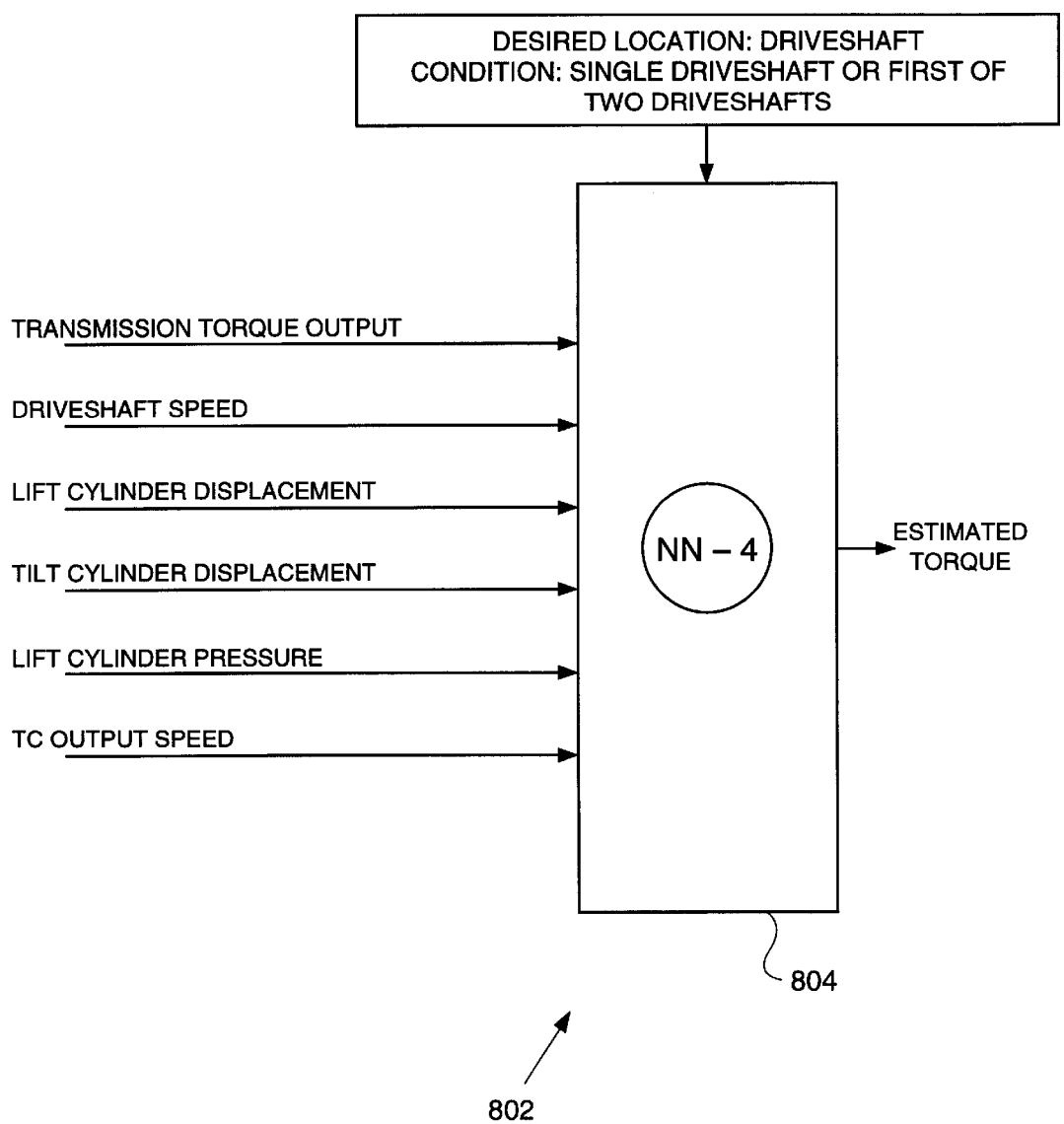
FIG. 16 is a diagrammatic illustration of a sixth aspect of the present invention.

In FIG. 16, a fourth neural network, NN-4, is used to estimate the torque at either a single driveshaft 114 or the first driveshaft 116 of a two driveshaft configuration. The parameters chosen are indicative of a hydraulic work machine having hydraulic cylinders used to control movement of an implement. Other parameters may be suitable for other types of machines. The parameter "transmission torque output" refers to the torque at the transmission output 308, and is preferably derived by one of the methods described above. Additional parameters may be added to improve the accuracy of the torque estimate. However, the trade-off is that processing time increases. Thus, the choice of parameters to use is a function of the desired level of accuracy compared with the processing time. It is noted that any of the neural networks or equations described with respect to the present invention may use a choice of additional parameters improve accuracy as well.

Figure 17:
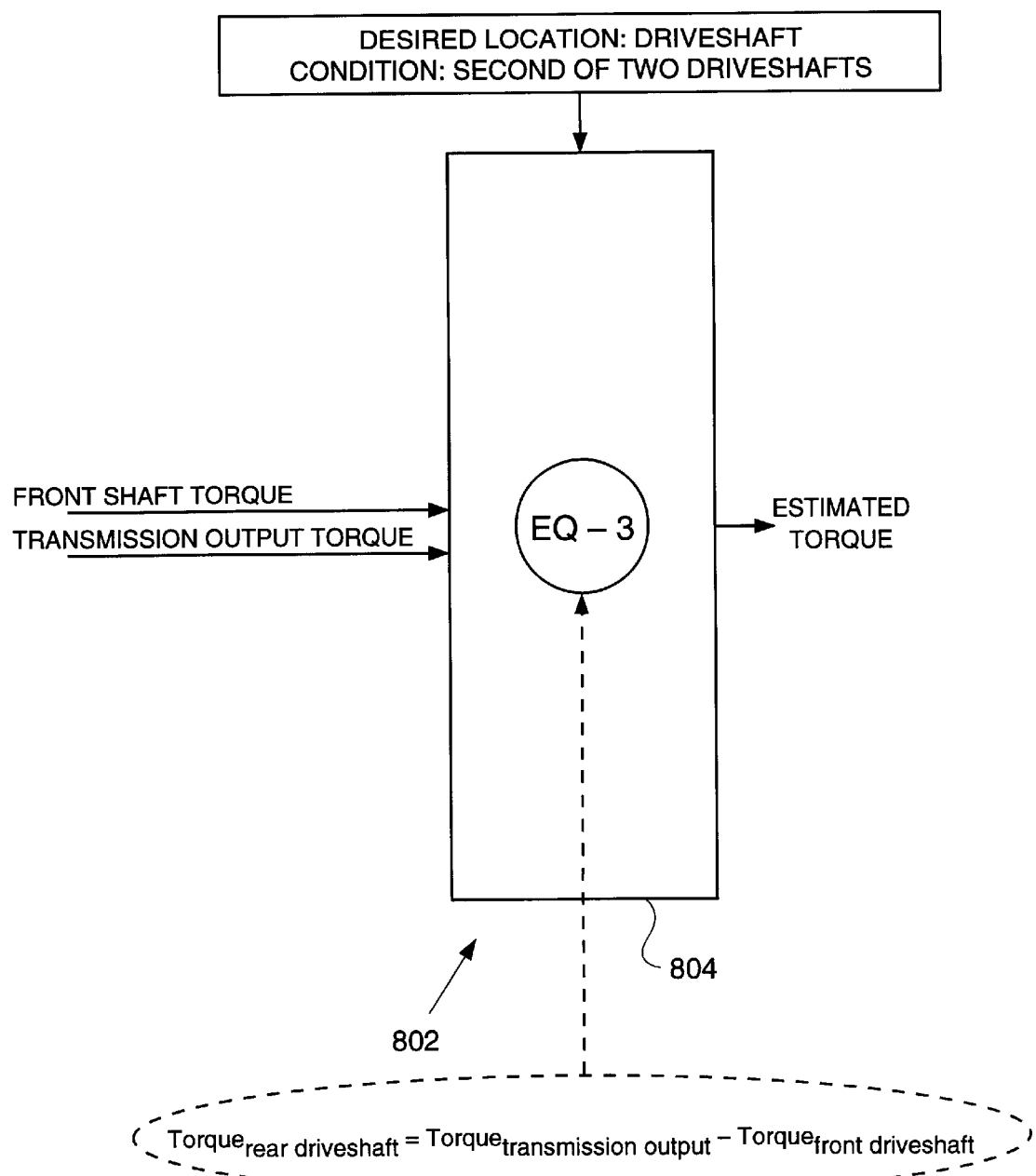
FIG. 17 is a diagrammatic illustration of a seventh aspect of the present invention.

In FIG. 17, a third equation, EQ-3, is used to estimate the torque at the second driveshaft 118 of a two driveshaft configuration. The torque at the first driveshaft 116, determined above, is preferably one of the parameters in the equation. The torque at the transmission output 308, also determined above, is the other parameter. In an alternate embodiment, the torque at the second driveshaft 118 may be determined by the use of a neural network such as the neural network described in FIG. 17.

In FIG. 18, a fifth neural network, NN-5, is used to estimate the torque at one or more axle shaft 120. If it is desired to determine torque at more than one axle shaft 120, the parameters "wheel speed" and "d (wheel speed)/dt", i.e., wheel acceleration, are unique to each axle shaft 120 under consideration.

Figure 10:
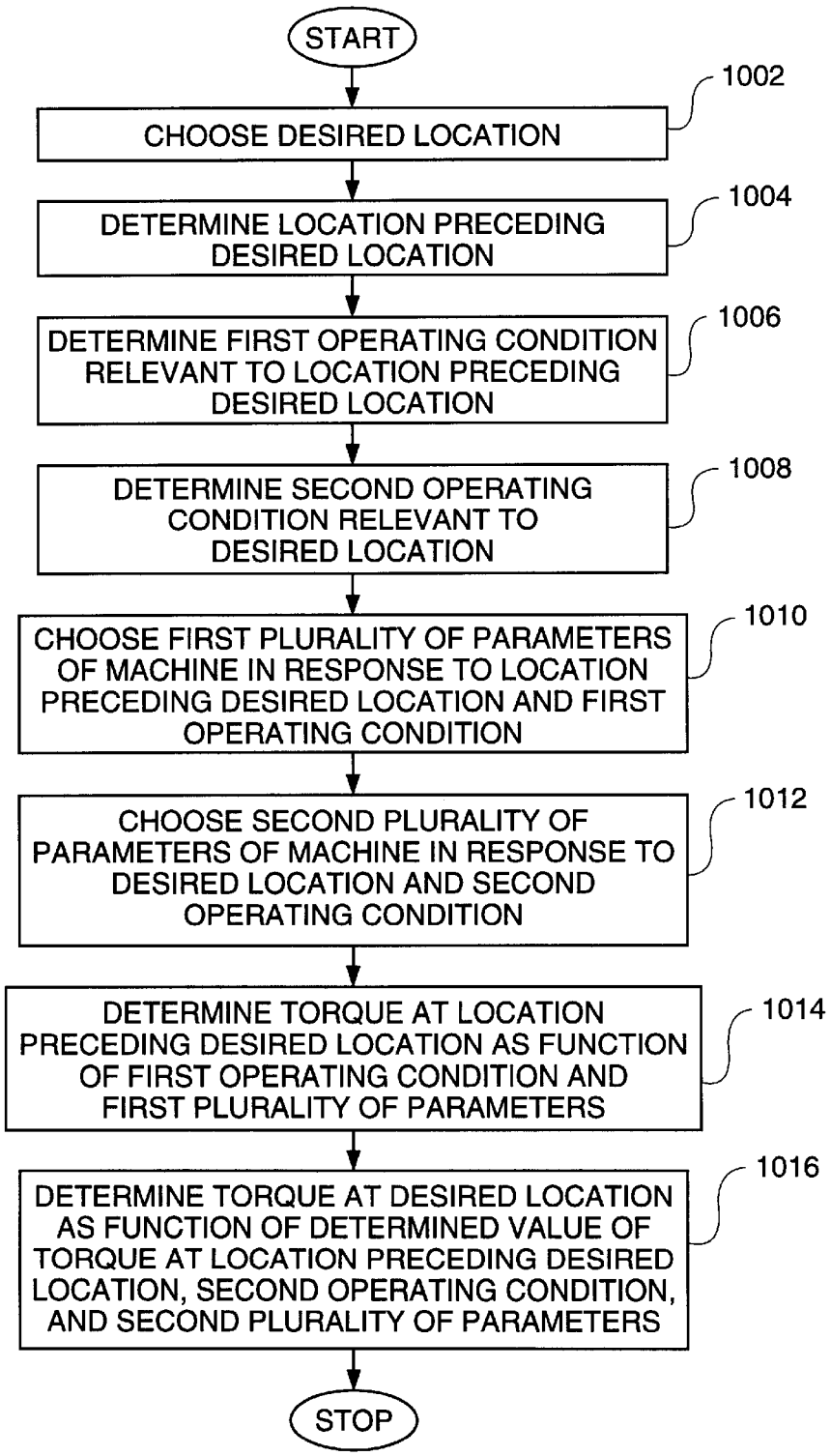
FIG. 10 is a flow diagram illustrating an alternate preferred method of the present invention.

Referring to FIG. 10, a flow diagram illustrating an alternate preferred embodiment of the present invention is shown. The alternate embodiment is applicable to those situations in which the torque is being determined at a desired location on the drivetrain 106 which requires the torque to be determined at a preceding location also.

In a first control block 1002, the desired location is chosen. In a second control block 1004, the location preceding the desired location is determined. For example, if the desired location is at the transmission output 308, the location preceding the desired location may be determined as the torque converter output 306.

In a third control block 1006, a first operating condition relevant to the location preceding the desired location is determined, preferably by one of the methods described above. In a fourth control block 1008, a second operating condition relevant to the desired location is determined.

In a fifth control block 1010, a first plurality of parameters of the machine 102 is chosen in response to the location preceding the desired location and the first operating condition. In a sixth control block 1012, a second plurality of parameters of the machine 102 is chosen in response to the desired location and the second operating condition.

In a seventh control block 1014, a value of torque at the location preceding the desired location is determined as a function of the first operating condition and the first plurality of parameters. In an eighth control block 1016, a value of torque at the desired location is determined as a function of the determined value of torque at the location preceding the desired location, the second operating condition, and the second plurality of parameters.

Industrial Applicability

The present invention provides a method and apparatus 100 for determining a value of torque at a desired location on a machine 102. As an example of an application of the present invention, a mobile machine 104, such as a wheel loader, is typically used to perform work functions which require a great deal of power, and thus torque, to be generated and applied to the drivetrain 106 of the machine 102. It is highly desired to have the ability to determine the values of torque at various locations on the drivetrain 106 during operation of the machine 102. However, torque sensors are often exposed to harsh environments which result in frequent failure of the sensors, degradation in the accuracy of the sensors, and increased costs associated with the problems incurred.

The present invention resolves the problems inherent with torque sensors, and offers advantages such as the ability to determine torque necessary to predict the life of critical components such as axle shafts 120, optimize performance of the machines 102, and improve control of the machines 102 during operation.

Other aspects, objects, and features of the present invention can be obtained from a study of the drawings, the disclosure, and the appended claims.

What is claimed is:

1. A method for determining a value of torque at a desired location on a machine, including the steps of:

choosing the desired location;

determining an operating condition relevant to the desired location;

determining a plurality of parameters of the machine in response to the desired location and the operating condition; and determining a value of torque at the desired location as a function of the operating condition and the plurality of parameters, the function including the steps of:

inputting the plurality of parameters to a neural network; and outputting the determined value of torque from the neural network.

2. A method for determining a value of torque at a desired location on a machine, including the steps of:

choosing the desired location;

determining an operating condition relevant to the desired location;

determining a plurality of parameters of the machine in response to the desired location and the operating condition; and determining a value of torque at the desired location as a function of the operating condition and the plurality of parameters, the function including the steps of:

choosing a first one of an equation and a neural network as a function of a location preceding the desired location and an operating condition of the location preceding the desired location;

choosing a first plurality of parameters of the machine in response to the location preceding the desired location and the operating condition of the location preceding the desired location;

determining a value of torque at the location preceding the desired location as a function of the operating condition of the location preceding the desired location and the first plurality of parameters;

choosing a second one of an equation and a neural network as a function of the desired location and an operating condition of the desired location;

choosing a second plurality of parameters of the machine in response to the desired location and the operating condition of the desired location; and determining a value of torque at the desired location as a function of the determined value of torque at the location preceding the desired location, the operating condition of the desired location, and the second plurality of parameters.

3. A method for determining a value of torque at an output location of a torque converter on a drivetrain of a mobile machine, the drivetrain including an engine, the torque converter, a transmission, at least one driveshaft, and at least one axle shaft, the torque converter including a lock-up clutch and an impellar clutch, including the steps of:

determining a condition of the lock-up clutch being in one of an engaged and a disengaged state;

determining a condition of the impeller clutch being in one of an engaged and a slipping state;

determining a plurality of parameters of the mobile machine; and determining a value of torque at the output location of the torque converter as a function of the condition of the lock-up clutch, the condition of the impeller clutch and the plurality of parameters, the function including the steps of:

choosing a first neural network in response to the lock-up clutch being engaged;

choosing a first equation in response to the lock-up clutch being disengaged and the impeller clutch being engaged; and choosing a second neural network in response to the lock-up clutch being disengaged and the impeller clutch being in a slipping state.

4. A method for determining a value of torque at an output of a transmission on a mobile machine, the mobile machine having a drivetrain, the drivetrain including an engine, a torque converter, the transmission, at least one driveshaft, and at least one axle shaft, the transmission including a set of transmission clutches, including the steps of:

determining a condition of the transmission clutches being in one of a locked and a slipping state;

determining a plurality of parameters of the mobile machine; and determining a value of torque at the output of the transmission as a function of the condition of the transmission clutches and the plurality of parameters, the function including the steps of:

choosing a second equation in response to the transmission clutches being in a locked state; and choosing a third neural network in response to the transmission clutches being in a slipping state.

5. A method, for determining a value of torque on at least one driveshaft on a mobile machine, the mobile machine having a drivetrain, the drivetrain including an engine, a torque converter, a transmission, the at least one driveshaft, and at least one axle shaft, including the steps of:

determining an operating condition relevant to the at least one driveshaft;

determining a plurality of parameters of the mobile machine; and determining a value of torque on the at least one driveshaft as a function of the operating condition and the plurality of parameters, the function including the steps of:

choosing a fourth neural network in response to the at least one driveshaft being a first driveshaft; and choosing a third equation in response to the at least one driveshaft being a second driveshaft.

6. A method for determining a value of torque on at least one axle shaft on a mobile machine, the mobile machine having a drivetrain, the drivetrain including an engine, a torque converter, a transmission, at least one driveshaft, and the at least one axle shaft, including the steps of:

determining an operating condition relevant to the at least one axle shaft;

determining a plurality of parameters of the mobile machine; and determining a value of torque at the desired location as a function of the operating condition and the plurality of parameters, the function including the step of choosing a fifth neural network.

7. A method for determining a value of torque at a desired location on a machine, including the steps of:

choosing the desired location;

determining a location preceding the desired location;

determining a first operating condition relevant to the location preceding the desired location;

determining a second operating condition relevant to the desired location;

choosing a first plurality of parameters of the machine in response to the location preceding the desired location and the first operating condition;

choosing a second plurality of parameters of the machine in response to the desired location and the second operating condition;

determining a value of torque at the location preceding the desired location as a function of the first operating condition and the first plurality of parameters; and determining a value of torque at the desired location as a function of the determined value of torque at the location preceding the desired location, the second operating condition, and the second plurality of parameters.

* * * * *